US010173564B2

(12) United States Patent
Fujiwara et al.

(10) Patent No.: US 10,173,564 B2
(45) Date of Patent: *Jan. 8, 2019

(54) VEHICLE SEAT

(71) Applicant: NHK SPRING CO., LTD., Yokohama-shi (JP)

(72) Inventors: Keiichiro Fujiwara, Yokohama (JP); Ryousuke Tanaka, Yokohama (JP); Masaharu Sanpei, Tokyo (JP)

(73) Assignee: NHK Spring Co., Ltd., Yokohama-shi, Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/611,588

(22) Filed: Jun. 1, 2017

(65) Prior Publication Data

US 2017/0349074 A1     Dec. 7, 2017

(30) Foreign Application Priority Data

Jun. 6, 2016 (JP) .................................. 2016-113030

(51) Int. Cl.
  *B60N 2/64*   (2006.01)
  *B60N 2/28*   (2006.01)
  *B60N 2/58*   (2006.01)
  *B60N 2/70*   (2006.01)

(52) U.S. Cl.
  CPC ............. *B60N 2/64* (2013.01); *B60N 2/2887* (2013.01); *B60N 2/58* (2013.01); *B60N 2/5825* (2013.01); *B60N 2/7017* (2013.01)

(58) Field of Classification Search
  CPC .... B60N 2/2887; B60N 2/289; B60N 2/2893; B60N 2/5883
  See application file for complete search history.

(56) References Cited

U.S. PATENT DOCUMENTS

| 6,416,128 B1* | 7/2002 | Fujii | B60N 2/2893 |
| | | | 297/218.1 |
| 7,281,763 B1* | 10/2007 | Hayashi | B60N 2/2893 |
| | | | 297/253 |
| 7,699,396 B2* | 4/2010 | Ghisoni | B60N 2/58 |
| | | | 297/188.2 |

(Continued)

FOREIGN PATENT DOCUMENTS

| JP | 2008-001214 A | 1/2008 | |
| JP | 2010-155516 A | 7/2010 | |
| JP | 2017081219 A * | 5/2017 | ........... B60N 2/5883 |

*Primary Examiner* — Timothy J Brindley
(74) *Attorney, Agent, or Firm* — Knobbe, Martens, Olson & Bear, LLP

(57) ABSTRACT

Lower end portions of an edge and another edge are fixed to a wire through pull-in cloths and a fixing member such that the pull-in cloths pull the lower end portions in toward the rear and into an opening (slit). This enables the edge and the another edge to be closed together in a state in which tension is applied to a front covering and a side covering. This enables the external appearance of a seatback to be preserved. Further, the edge and the another edge can be separated from each other, enabling a connector to be inserted into the opening from between the edge and the another edge, and the connector to be connected to an ISOFIX member. An inferior external appearance of the seatback can accordingly be suppressed while securing insertability of the connector.

4 Claims, 18 Drawing Sheets

(56) References Cited

U.S. PATENT DOCUMENTS

| | | | | |
|---|---|---|---|---|
| 9,592,750 | B2* | 3/2017 | Asaeda | B60N 2/58 |
| 9,725,017 | B2* | 8/2017 | Imayou | B60N 2/2887 |
| 9,783,085 | B2* | 10/2017 | Nilius | B60N 2/28 |
| 2015/0084388 | A1* | 3/2015 | Arai | B60N 2/6009 |
| | | | | 297/250.1 |
| 2016/0200224 | A1* | 7/2016 | Fujikake | B60N 2/289 |
| | | | | 297/452.38 |
| 2016/0250948 | A1* | 9/2016 | Sekino | B60N 2/6009 |
| | | | | 297/452.48 |
| 2016/0325658 | A1* | 11/2016 | Hodgson | B60N 2/58 |
| 2016/0375807 | A1* | 12/2016 | Kageyama | B60N 2/5883 |
| | | | | 297/452.61 |
| 2017/0001548 | A1* | 1/2017 | Iwakata | B60N 2/58 |
| 2017/0259709 | A1* | 9/2017 | Shibuya | B60N 2/58 |
| 2017/0259710 | A1* | 9/2017 | Oga | B60N 2/2893 |
| 2017/0349066 | A1* | 12/2017 | Fujiwara | B60N 2/2893 |
| 2018/0022255 | A1* | 1/2018 | Abe | B60N 2/5883 |

\* cited by examiner

VEHICLE SEAT

CROSS-REFERENCE TO RELATED APPLICATION

This application claims priority under 35 USC 119 from Japanese Patent Application No. 2016-113030 filed Jun. 6, 2016, the disclosure of which is incorporated by reference herein.

BACKGROUND

Technical Field

The present invention relates to a vehicle seat.

Related Art

Japanese Patent Application Laid-Open (JP-A) No. 2010-155516 describes a vehicle seat in which slits are formed in a portion of a covering of a seatback where a connector of a child seat is inserted.

In a configuration in which slits are formed in a covering, such as in the vehicle seat described in JP-A No. 2010-155516, the slit openings must be enlarged to secure insertability of the connector of the child seat. However, when the slit openings are enlarged, load from repeated insertion of the connector or from an occupant is liable to cause wrinkling and the like in the covering, and there is concern of this causing the seatback to have an inferior external appearance.

SUMMARY

In consideration of the above circumstances, the present invention suppresses an inferior external appearance of a seatback while securing insertability of a connector of a child seat.

A vehicle seat of a first aspect of the present invention includes a seatback pad, a connection member, a first covering, a second covering, a first pull-in member, and a second pull-in member. The seatback pad configures a cushion member of a seatback, and is formed with an opening into which a connector of a child seat can be inserted from a seat front so as to penetrate through a lower end section of the seatback pad in a seat front-rear direction. A front end of the opening has a width along a seat width direction that is narrower than a seat width direction width of the connector. The connection member is provided at a seat rear side with respect to the front end of the opening, and the connector inserted into the opening is connected to the connection member. The first covering covers a front face of the seatback pad at one seat width direction side of the opening, and includes a first edge disposed in the opening. The second covering covers the front face of the seatback pad at another seat width direction side of the opening, and includes a second edge disposed in the opening. The first pull-in member includes one end portion fixed to a fixing member disposed further to the seat rear side than a connection position of the connection member and the connector, and another end portion connected to the first edge. The first pull-in member is configured to pull the first edge in toward the seat rear side of the opening so as to enable the first edge to separate from the second edge. The second pull-in member includes one end portion fixed to the fixing member disposed further to the seat rear side than the connection position of the connection member and the connector, and another end portion connected to the second edge. The second pull-in member is configured to pull the second edge in toward the seat rear side of the opening so as to enable the second edge to separate from the first edge.

According to the first aspect, the connector of a child seat can be inserted from the seat front into the opening penetrating through the lower end section of the seatback pad in the seat front-rear direction.

Further, the first edge of the first covering that covers the front face of the seatback pad at the one seat width direction side of the opening is pulled in toward the seat rear side of the opening by the first pull-in member. Further, the second edge of the second covering that covers the front face of the seatback pad at the another seat width direction side of the opening is pulled in toward the seat rear side of the opening by the second pull-in member. This enables the first edge and the second edge to be closed together in a state in which tension is applied to the first covering and the second covering, enabling the external appearance of the seatback to be preserved.

Further, the first edge and the second edge can be separated from each other, enabling the connector to be inserted into the opening from between the first edge and the second edge such that the connector connects to the connection member.

As described above, according to the first aspect, an inferior external appearance of the seatback can be suppressed while securing insertability of the connector of a child seat.

In a vehicle seat of a second aspect of the present invention, the another end portion of the first pull-in member is disposed at the another seat width direction side with respect to the another end portion of the second pull-in member. The first pull-in member and the second pull-in member cross each other.

According to the second aspect, the first pull-in member and the second pull-in member cross each other, enabling the first edge and the second edge to be pulled in in a direction in which the first edge and the second edge close together. This enables an inferior external appearance of the seatback to be effectively suppressed.

A vehicle seat of a third aspect of the present invention further includes reinforcement members that are respectively disposed at the first edge and the second edge, and that are respectively sewn to the another end portion of the first pull-in member and the another end portion of the second pull-in member.

According to the third aspect, the first edge and the second edge are reinforced by the reinforcement members, enabling the first edge and the second edge to keep their respective shapes and enabling an inferior external appearance of the seatback to be suppressed.

In a vehicle seat of a fourth aspect of the present invention, a vertical groove is formed in the front face of the seatback pad so as to be continuous to the opening at an upper side of the opening. A seam between the first covering and the second covering is pulled toward the seat rear side into the vertical groove.

According to the fourth aspect, the vertical groove is formed so as to be continuous to the opening at the upper side of the opening, enabling the shape of the seatback pad to be simplified such that it is easier to process the seatback pad.

BRIEF DESCRIPTION OF THE DRAWINGS

Exemplary embodiments of the present invention will be described in detail based on the following figures, wherein.

DETAILED DESCRIPTION

Explanation follows regarding an example of an exemplary embodiment according to the present invention, based on the drawings.

(Vehicle Seat 10)

Explanation follows regarding a vehicle seat 10 according to an exemplary embodiment. In the following explanation, reference to front and rear, up and down, and left and right respectively refers to front and rear, up and down, and left and right with respect to the vehicle seat 10 unless specifically stated otherwise. Further, the seat width direction corresponds to the left-right direction of the vehicle seat 10. Moreover, a direction from the seat width direction center to the right end or left end of the vehicle seat 10 is referred to as the seat width direction outside, and the reverse direction thereto is referred to as the seat width direction inside.

Note that in each of the drawings, the arrow FR, the arrow UP, and the arrow OUT respectively indicate the seat front, the seat upper side, and the seat width direction outside, as appropriate. Further, in the following explanation, reference to front view refers to a view of the vehicle seat 10 from the seat front, reference to side view refers to a view of the vehicle seat 10 from the seat width direction outside, and reference to plan view refers to a view of the vehicle seat 10 from above.

Figure 1:
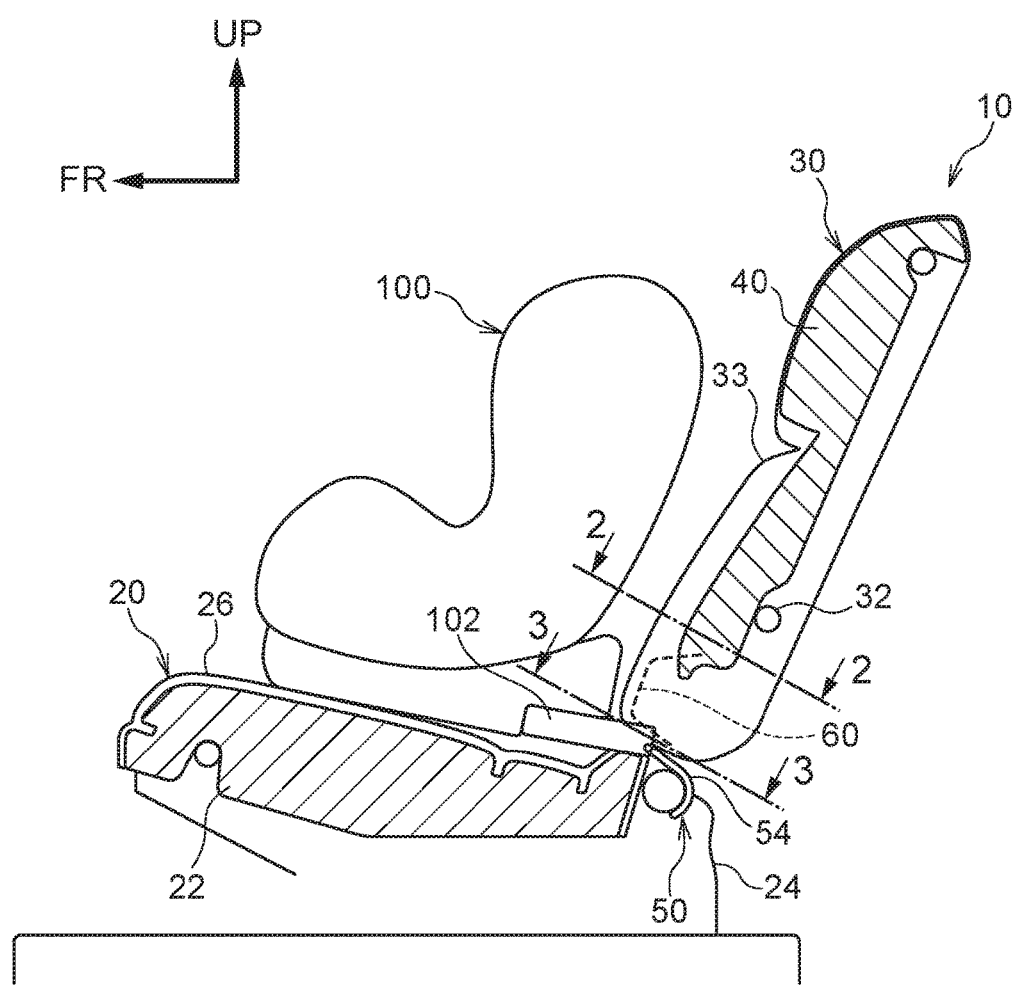
FIG. 1 is a side cross-section of a vehicle seat according to an exemplary embodiment.

Specific examples of the vehicle seat 10 include a second-row seat in the second row from the vehicle front, a rear seat (back seat), or a front passenger seat. As illustrated in FIG. 1, the vehicle seat 10 includes a seat cushion 20, a seatback 30, ISOFIX bars 50 (examples of a connection member), and insert wires 60 (examples of an elastic member).

(Seat Cushion 20)

The seat cushion 20 is a section on which an occupant sits, and as illustrated in FIG. 1, includes a seat cushion pad 22, a seat cushion frame 24, and a seat cushion cover 26.

The seat cushion pad 22 is a cushion member formed by a foamed body such as foamed urethane. The seat cushion frame 24 forms framework of the seat cushion 20 and supports the seat cushion pad 22. The seat cushion cover 26 is a covering that covers the seat cushion pad 22.

(Seatback 30)

Figure 2:
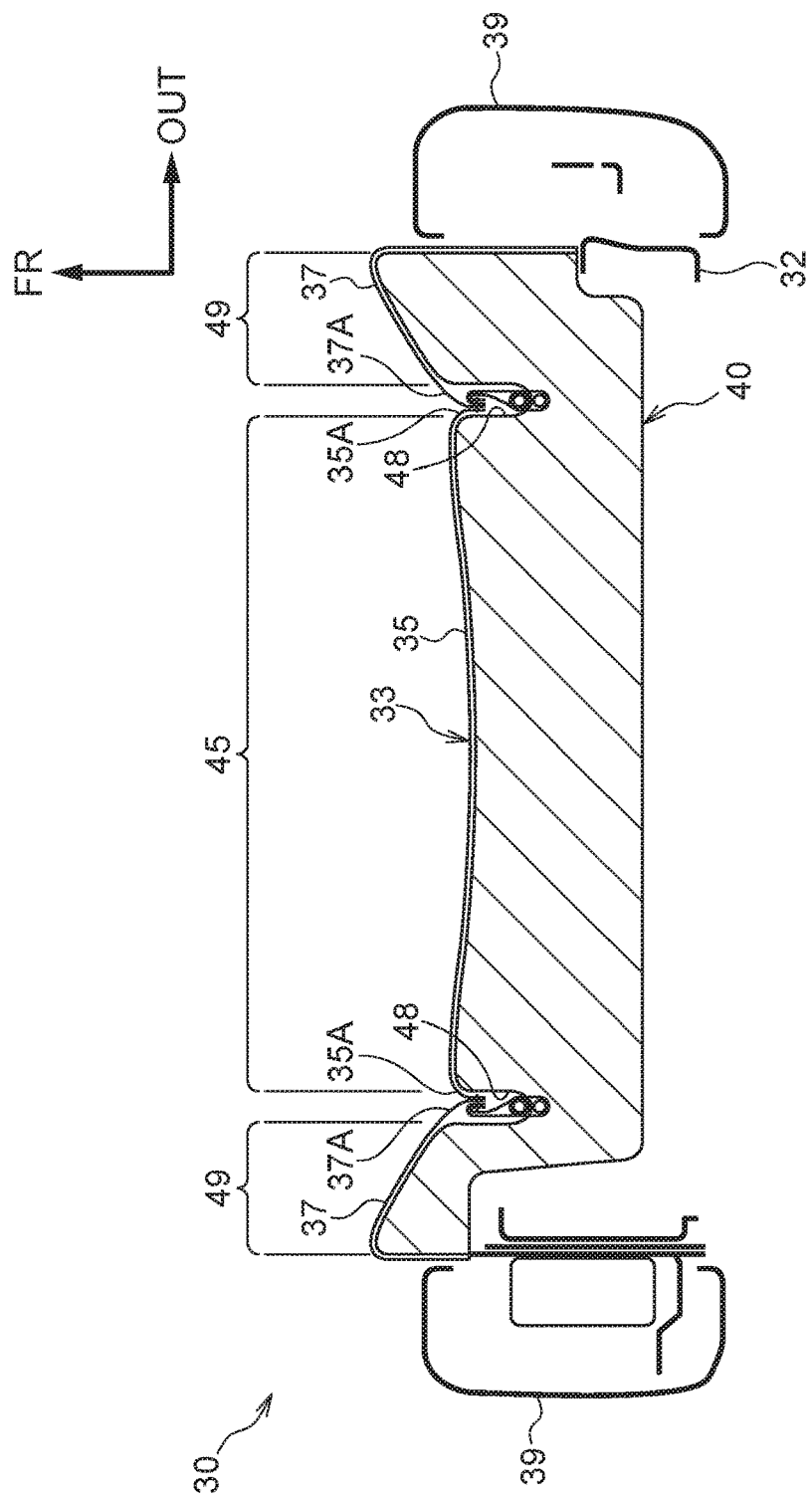
FIG. 2 is a horizontal cross-section (cross-section taken along line 2-2 of FIG. 1) of a vehicle seat according to an exemplary embodiment.

As illustrated in FIG. 1, the seatback 30 extends upward from a rear end section of the seat cushion 20 and is a section forming a backrest for the occupant. Specifically, the seatback 30 includes a seatback pad 40, a seatback frame 32, and a seatback cover 33. Note that as illustrated in FIG. 2 and FIG. 3, both seat width direction end sections of the seatback 30 are provided with side finishers 39.

(Seatback Pad 40)

The seatback pad 40 configures a cushion member of the seatback 30 and is formed by a foamed body such as foamed urethane. As illustrated in FIG. 2, FIG. 3, and FIG. 4, the seatback pad 40 includes a main body 45 configuring a seat width direction central section of the seatback pad 40, and side sections 49 provided at both seat width direction outer end sides of the main body 45. Front faces of the side sections 49 jut out progressively toward the front on progression toward the vehicle width direction outsides.

Figure 3:
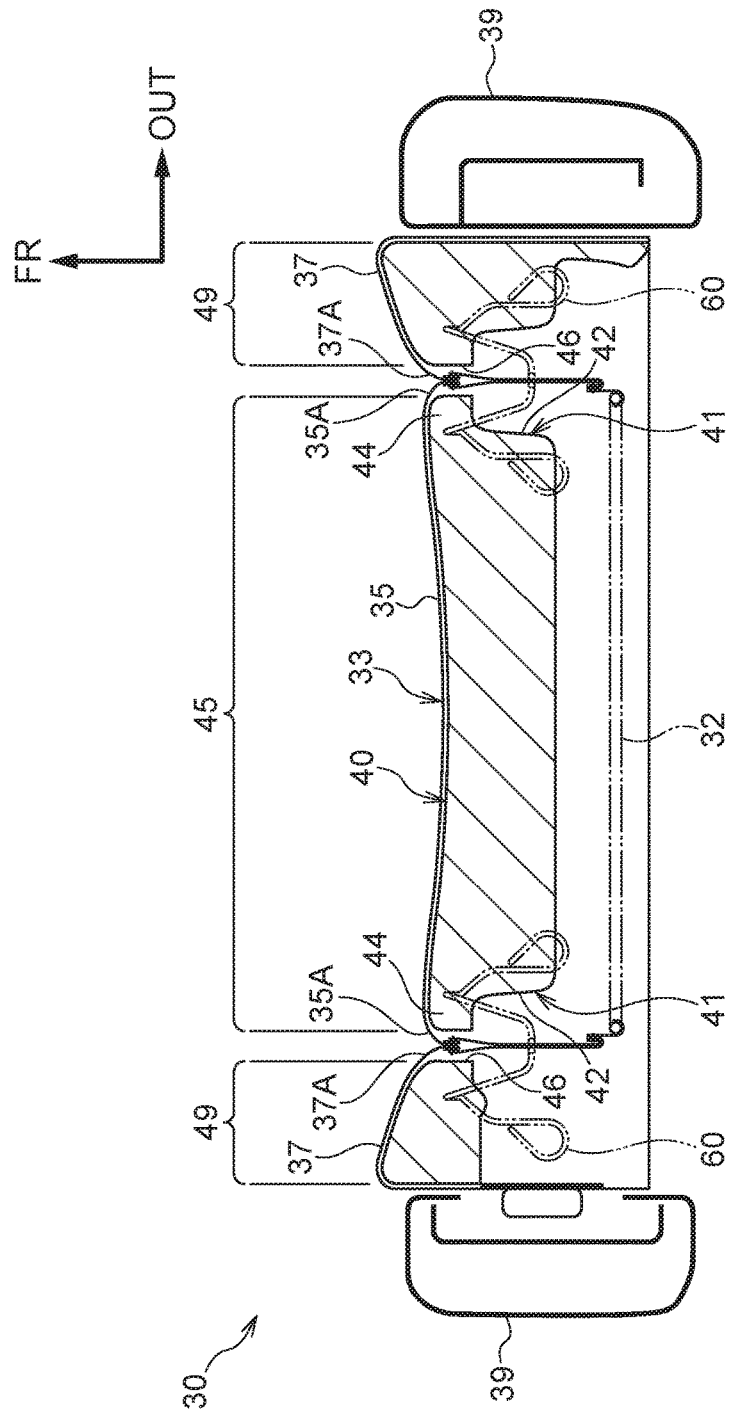
FIG. 3 is a horizontal cross-section (cross-section taken along line 3-3 of FIG. 1) of a vehicle seat according to an exemplary embodiment.
Figure 4:
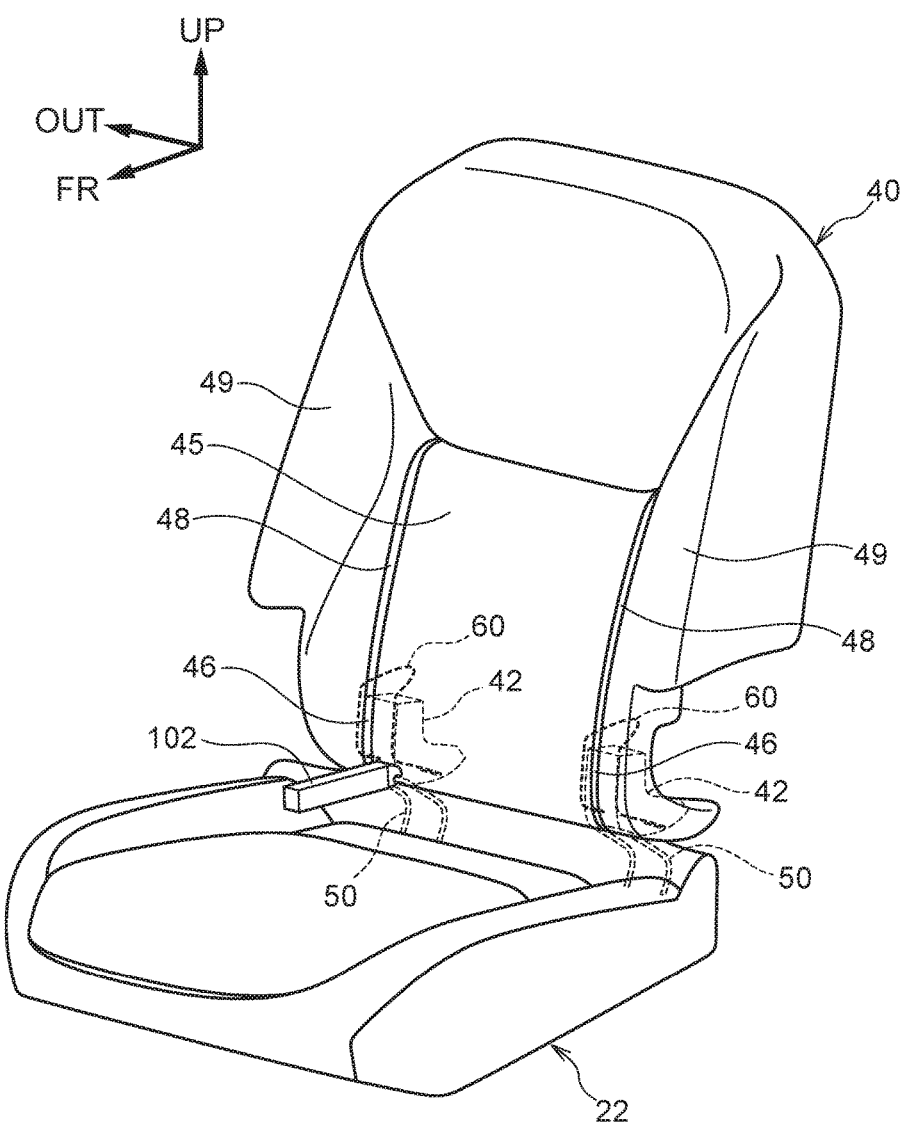
FIG. 4 is a perspective view of a seatback pad according to an exemplary embodiment.
Figure 5:
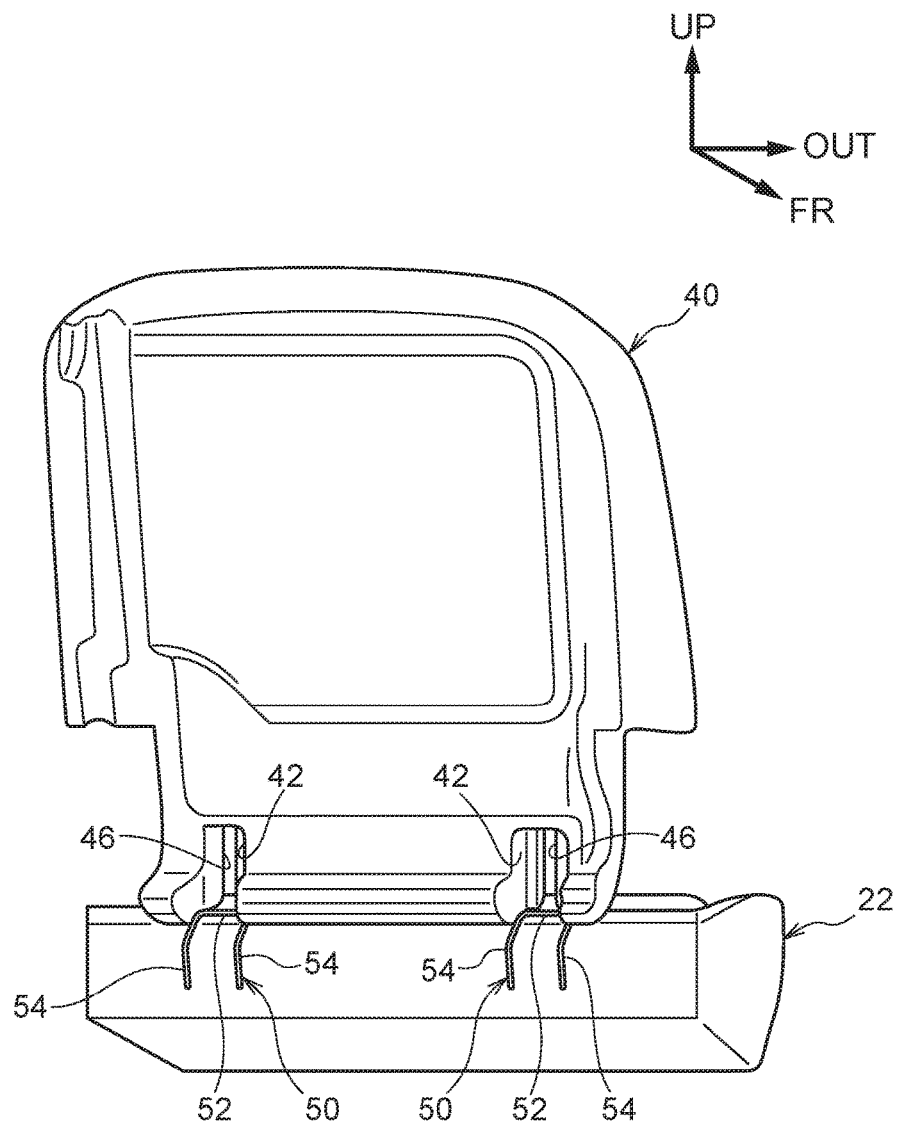
FIG. 5 is a perspective view of a seatback pad according to an exemplary embodiment as viewed from a rear side.
Figure 6:
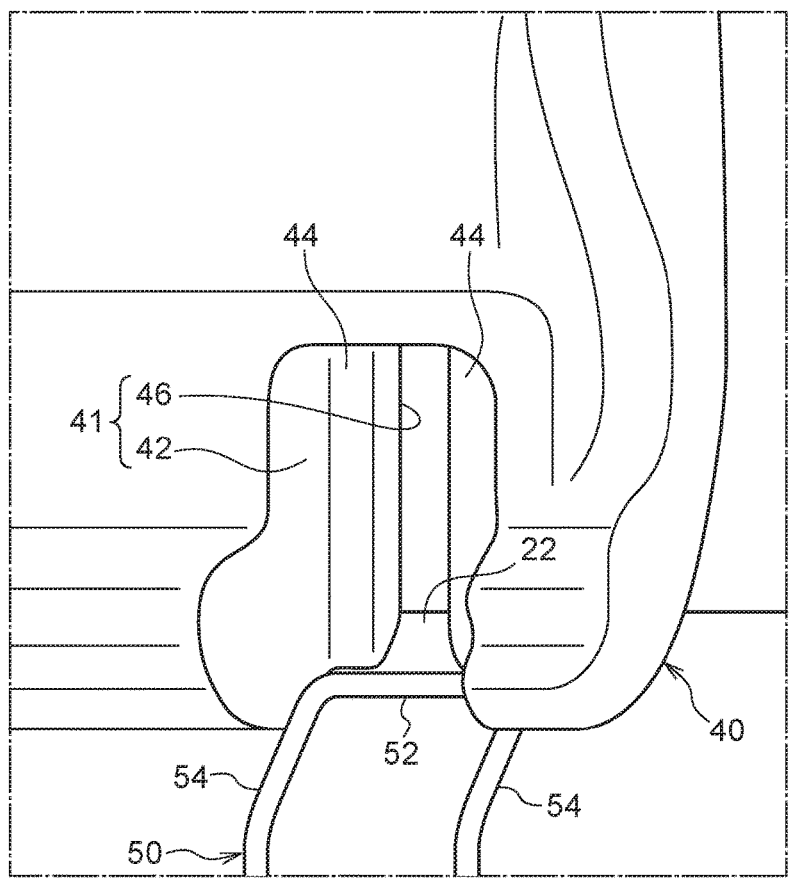
FIG. 6 is an enlarged perspective view illustrating an enlargement of part of the seatback pad illustrated in FIG. 5.

As illustrated in FIG. 3 and FIG. 5, recesses 42 (thinned portions) are formed in a lower end section of a rear face (back face) of the seatback pad 40. Specifically, as illustrated in FIG. 3, each recess 42 is formed between (at a boundary portion between) the main body 45 and the respective side section 49. As illustrated in FIG. 3 and FIG. 5, a left and right pair of the recesses 42 are disposed in the seatback pad 40. As illustrated in FIG. 3, the recesses 42 are formed with recessed shapes to make the front-rear direction thickness at the lower end section of the seatback pad 40 thinner, and as illustrated in FIG. 6 (an enlarged diagram of FIG. 5), the recesses 42 open toward the rear side and the lower side of the seatback pad 40.

By forming the recesses 42, as illustrated in FIG. 3, portions of the seatback pad 40 at the front side of the recesses 42 are configured by respective thinned portions 44 having a front-rear direction thickness thinner than other portions of the seatback pad 40 when viewed in horizontal cross-section.

In each thinned portion 44, a slit 46 is formed penetrating through the thinned portion 44 in the front-rear direction. As illustrated in FIG. 3 and FIG. 6, the slit 46 is formed along the up-down direction in a seat width direction central portion of the thinned portion 44 and extends from an upper end to a lower end of the thinned portion 44. The slit 46 is in communication with the recess 42 in the front-rear direction. Since the slit 46 and the recess 42 are in communication with each other in the front-rear direction, an opening 41 is configured penetrating through the seatback pad 40 in the front-rear direction. The opening 41 functions as an insert section into which a connector 102 (see FIG. 1)

of a child seat 100 can be inserted from the front. The respective connector 102 that has been inserted into the opening 41 is then connected to the ISOFIX bar 50 as described later (see FIG. 8).

Note that, as illustrated in FIG. 3, the lower end section of the seatback pad 40 is divided into the main body 45 and the side sections 49 by the openings 41 penetrating through the seatback pad 40 in the front-rear direction in this manner.

Figure 7:
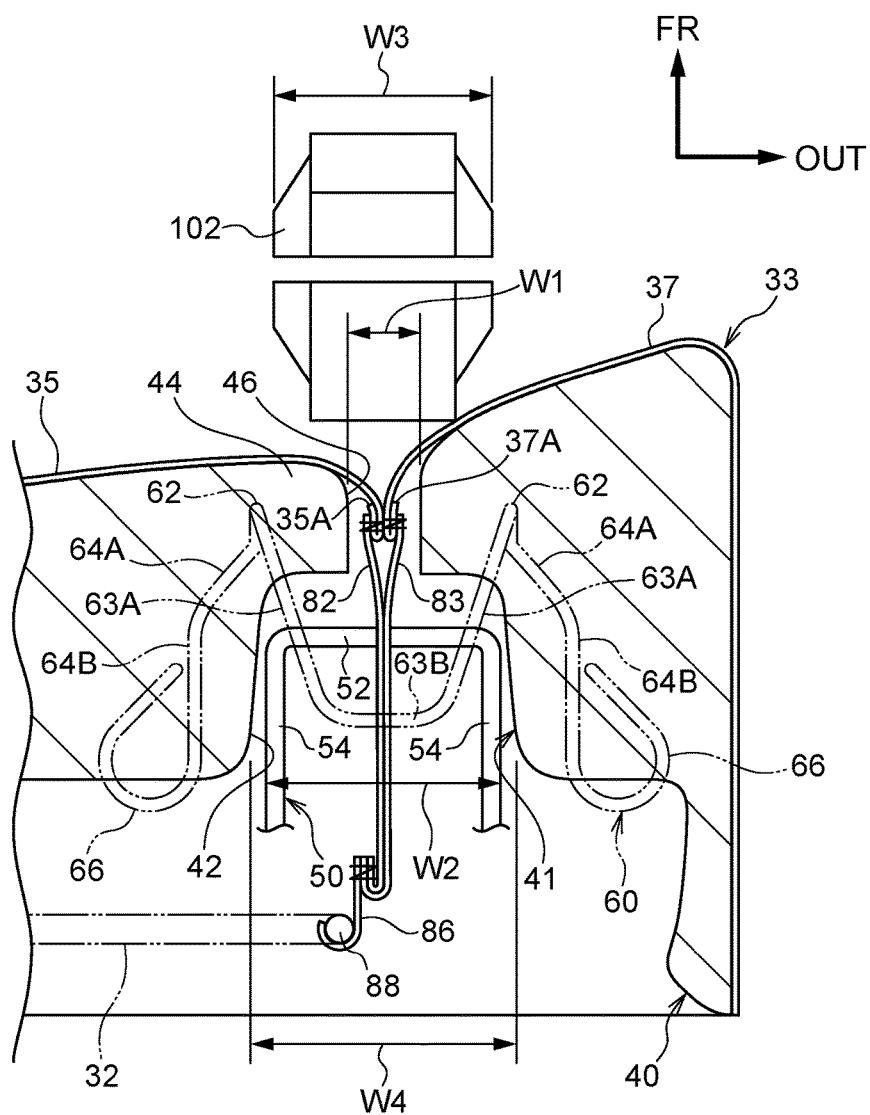
FIG. 7 is a horizontal cross-section illustrating an enlargement of part of the vehicle seat illustrated in FIG. 3.
Figure 8:
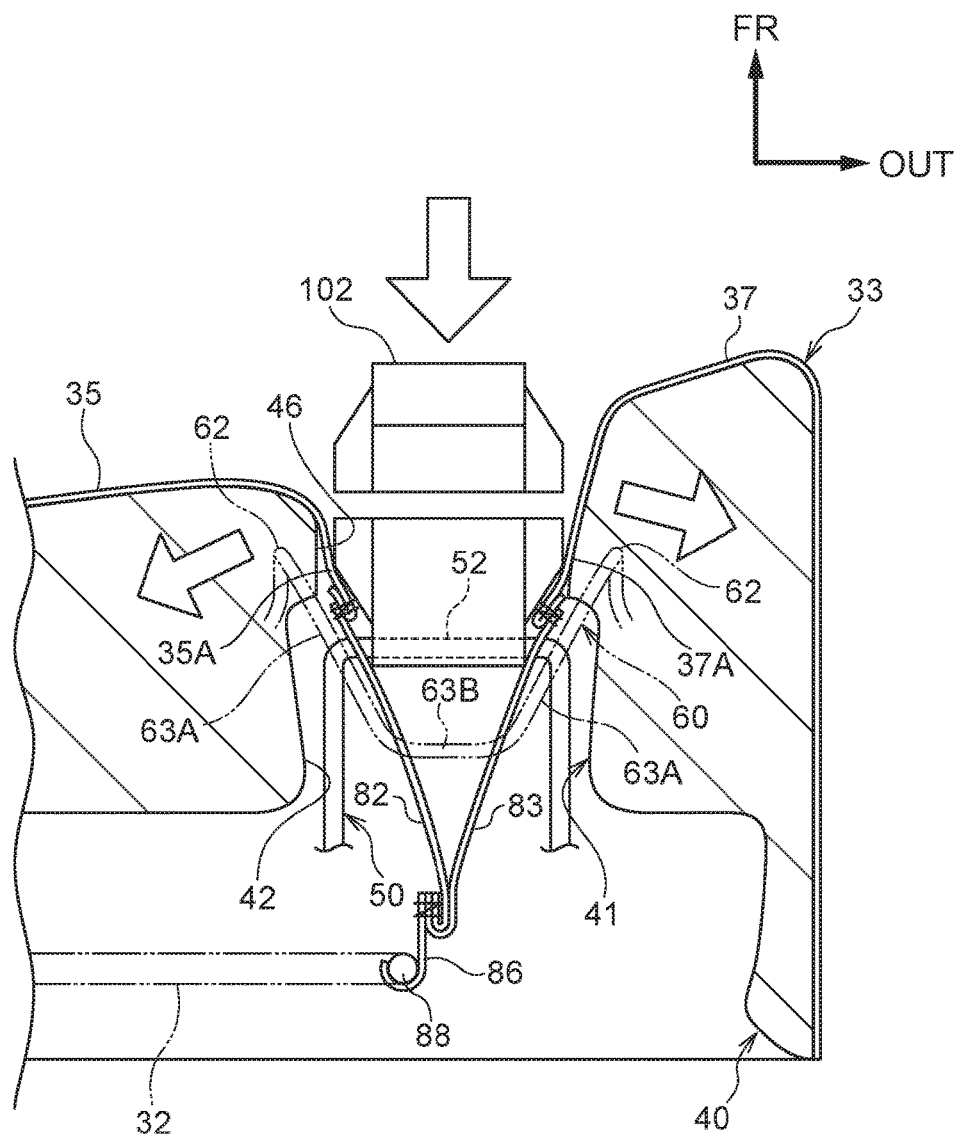
FIG. 8 is a horizontal cross-section of the vehicle seat illustrated in FIG. 7, illustrating a state in which a connector has been inserted into an opening.

As illustrated in FIG. 7, a seat width direction width W1 of the slit 46 (front end of the opening 41) is narrower than a seat width direction width W2 of the ISOFIX bar 50 and narrower than a seat width direction width W3 of the connector 102. As illustrated in FIG. 8, the connector 102 is thus inserted into the opening 41 while pushing the slit 46 (front end of the opening 41) open in the seat width direction. As illustrated in FIG. 7, a seat width direction width W4 of the recess 42 is wider than the seat width direction width W1 of the slit 46 (front end of the opening 41) and is wider than the seat width direction width W2 of the ISOFIX bar 50.

Note that the up-down direction lengths of the slit 46 and the recess 42 are respectively longer than the seat width direction widths W1, W4 of the slit 46 and the recess 42 and longer than the up-down direction length of the connector 102.

As illustrated in FIG. 2 and FIG. 4, above each slit 46, a vertical groove 48 is formed in a front face of the seatback pad 40 so as to be continuous to the slit 46. Thus, the vertical groove 48 and the slit 46 are formed in the front face of the seatback pad 40 so as to be continuous to each other, in this order from the top, of the vertical groove 48 and the slit 46. The vertical groove 48 is a groove for pulling a seam 70 (see FIG. 9), described later, of the seatback cover 33 in toward the rear. The vertical groove 48 does not penetrate through the seatback pad 40 in the front-rear direction.

(Seatback Frame 32)

The seatback frame 32 forms framework of the seatback 30 and supports the seatback pad 40 from the rear side. FIG. 1, FIG. 2, and so on partially illustrate the seatback frame 32. Note that configuration of the seatback cover 33 of the seatback 30 will be described later.

(ISOFIX Bars 50)

Each ISOFIX bar 50 is an attachment fitting (anchor) for attaching the connector 102 of the child seat 100 in accordance with ISOFIX (International Standard), and each ISOFIX bar 50 functions as an example of a connection member to which the connector 102 is connected.

As illustrated in FIG. 5, a left and right pair of the ISOFIX bars 50 are disposed at a rear section of the vehicle seat 10. More specifically, as illustrated in FIG. 6, each ISOFIX bar 50 is disposed at the rear side of the respective opening 41 of the seatback pad 40.

Each ISOFIX bar 50 is a rod shape (linear shape) that has been formed into a U-shape in plan view (see FIG. 7), and includes a front portion 52 extending in the seat width direction and a pair of side portions 54 extending from both length direction ends of the front portion 52 toward the rear side. As illustrated in FIG. 1, in side view, a rear side portion of each side portion 54 is curved downward, and this rear side portion is fixed to the seat cushion frame 24. The front portion 52 is a connection portion to which the connector 102 of the child seat 100 that has been inserted into the opening 41 is connected. As illustrated in FIG. 6 and FIG. 7, in plan view, the front portion 52 is disposed inside the recess 42 of the seatback pad 40 in a state in which there is a gap between the front portion 52 and the thinned portion 44. Thus, part of the ISOFIX bar 50 may be disposed inside the opening 41, it being sufficient that the ISOFIX bar 50 is disposed to the rear side of at least the front end of the opening 41 (slit 46). Note that the ISOFIX bar 50 may be configured fixed to a vehicle body side.

(Seatback Cover 33)

The seatback cover 33 is a covering for covering the seatback pad 40. More specifically, the seatback cover 33 includes a front covering 35 (an example of a first covering) and a pair of side coverings 37 (examples of a second covering), as illustrated in FIG. 2 and FIG. 3.

At the seat width direction inside of the vertical grooves 48 and the slits 46, the front covering 35 covers the front face of the main body 45 of the seatback pad 40. At the seat width direction outsides of the vertical grooves 48 and the slits 46, the side coverings 37 cover the front faces and the side faces of the side sections 49 of the seatback pad 40.

Edges 35A (examples of a first edge) at the seat width direction outsides of the front covering 35 are formed in the up-down direction, along the vertical grooves 48 and the slits 46. The edges 35A are disposed in the vertical grooves 48 and the slits 46. Similarly, edges 37A (examples of a second edge) at the seat width direction inside of the respective side coverings 37 are also formed in the up-down direction, along the vertical grooves 48 and the slits 46. The edges 37A are disposed in the vertical grooves 48 and the slits 46.

Figure 9:
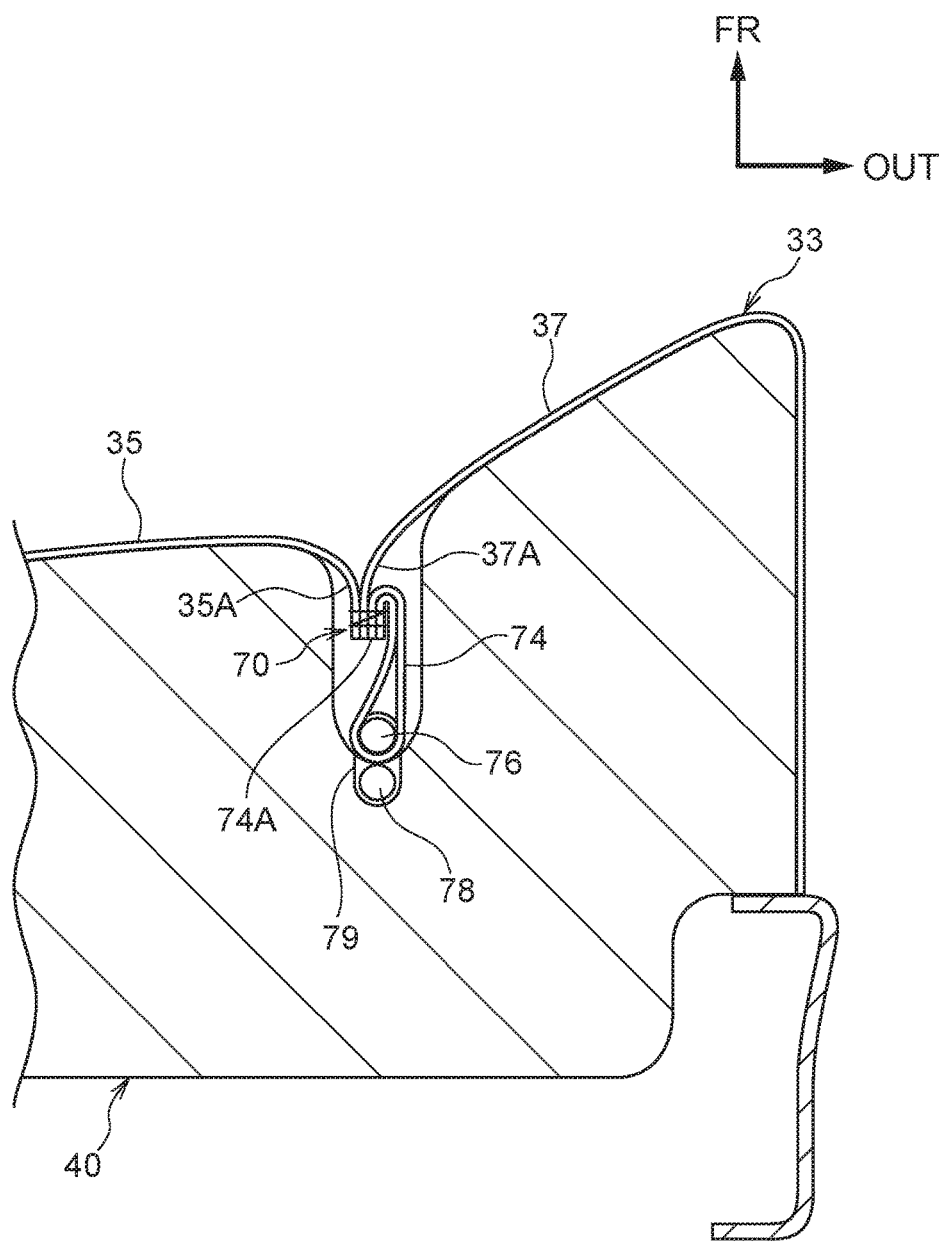
FIG. 9 is a horizontal cross-section illustrating an enlargement of part of the vehicle seat illustrated in FIG. 2.

As illustrated in FIG. 9, upper side portions (portions disposed in the vertical grooves 48) of each edge 35A and edge 37A are stitched together to form the seam 70. The edge 35A, the edge 37A, and an edge 74A of a pull-in sleeve 74 (suspension sleeve) are sewn together at the seam 70. A wire 76 extending along the up-down direction is inserted through the pull-in sleeve 74.

Inside the seatback pad 40, the wire 76 is coupled and fixed to a wire 78 extending along the up-down direction using hog rings 79. The wire 78 is embedded into the seatback pad 40 by integral foaming. By thus coupling and fixing the seam 70 to the wire 78 through the pull-in sleeve 74 and the like, the pull-in sleeve 74 pulls the seam 70 in toward the rear and inside the vertical groove 48, applying tension to the front covering 35 and the side covering 37.

On the other hand, lower end portions of the edge 35A and the edge 37A (portions disposed in the slit 46) are respectively stitched to front end portions (examples of other end portions) of a pull-in cloth 82 (an example of a first pull-in member) and a pull-in cloth 83 (an example of a second pull-in member). The lower end portions of the edge 35A and the edge 37A are not stitched together and so are capable of separating from each other.

Rear end portions of the pull-in cloths 82, 83 (examples of one end portions) are sewn together to a hook shaped fixing member 86, thereby fixing the rear end portions of the pull-in cloths 82, 83. The fixing member 86 is fixed to a wire 88 provided to the seatback frame 32 and extending along the up-down direction. The lower end portions of the edge 35A and the edge 37A are thus fixed to the wire 88 through the pull-in cloths 82, 83 and the fixing member 86 such that the pull-in cloths 82, 83 pull the lower end portions in toward the rear and inside the opening 41, thus applying tension to the front covering 35 and the side covering 37. The edge 35A and the edge 37A contact each other such that a closed state between the edge 35A and the edge 37A is achieved.

The fixing member 86 is disposed further to the rear side than the front portion 52 of the ISOFIX bar 50 (a connection position of the ISOFIX bar 50 and the connector 102). At the rear side of the front portion 52, the pull-in cloths 82, 83 are fixed to the fixing member 86. The pull-in cloths 82, 83 are thereby capable of separating from each other at the front side of the position where the pull-in cloths 82, 83 are fixed to the fixing member 86 (including the connection position of the ISOFIX bar 50 and the connector 102). Namely, as illustrated in FIG. 8, the edge 35A and the pull-in cloth 82, and the edge 37A and the pull-in cloth 83, are capable of separating (opening) such that the front portion 52 is exposed at the front. As described above, the lower end portions of the edge 35A and the edge 37A configure a pull-in structure (suspension structure).

(Insert Wires 60)

Each of the insert wires 60 is configured by an elastic member capable of deforming elastically. For example, a linear shaped wire formed by a metal material, a resin material, or the like is employed as the insert wire 60.

As illustrated in FIG. 4, the insert wires 60 are, for example, embedded into the seatback pad 40 by integral foaming. Integral foaming is performed by, for example, placing the insert wires 60 into a mold for the seatback pad 40 and then foaming a foaming material to form the seatback pad 40 containing the insert wires 60.

Note that configuration may be made in which the insert wires 60 are placed into the seatback pad 40 after the seatback pad 40 has been formed (post-forming placement). Further, configuration may be made in which the insert wires 60 are disposed at the rear face of the seatback pad 40.

Figure 10:
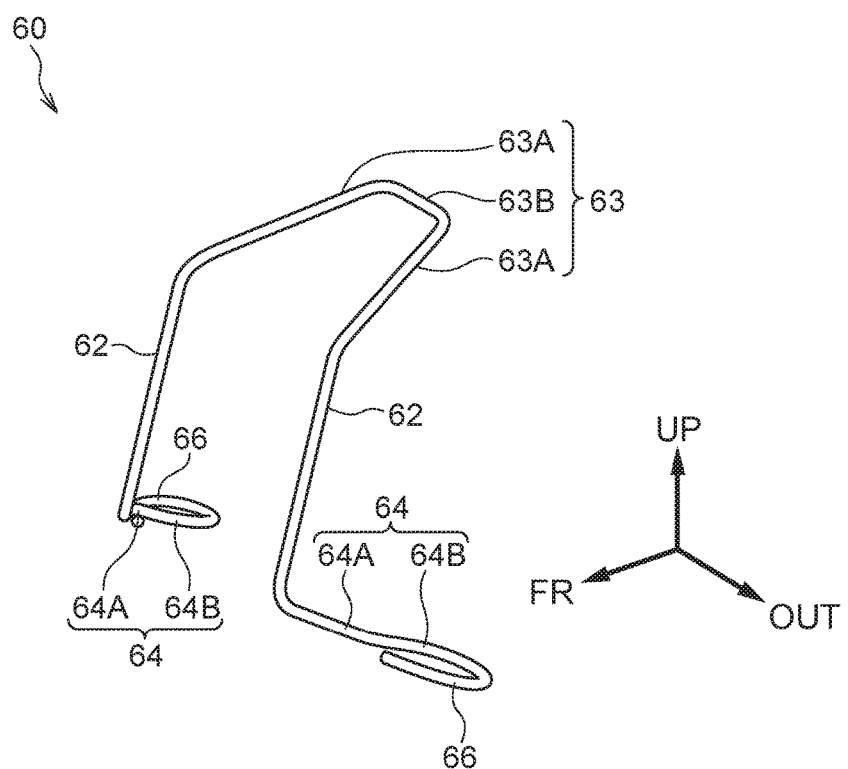
FIG. 10 is a perspective view of an insert wire according to an exemplary embodiment.
Figure 11:
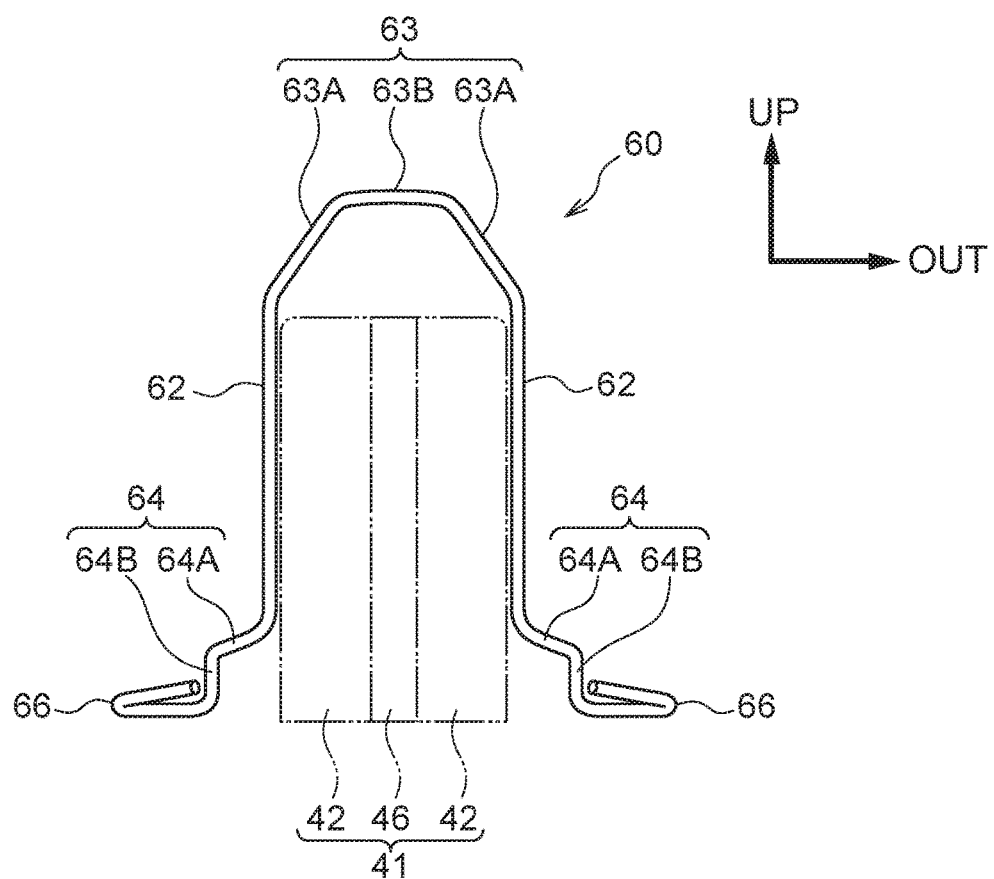
FIG. 11 is a front view of an insert wire according to an exemplary embodiment.
Figure 12:
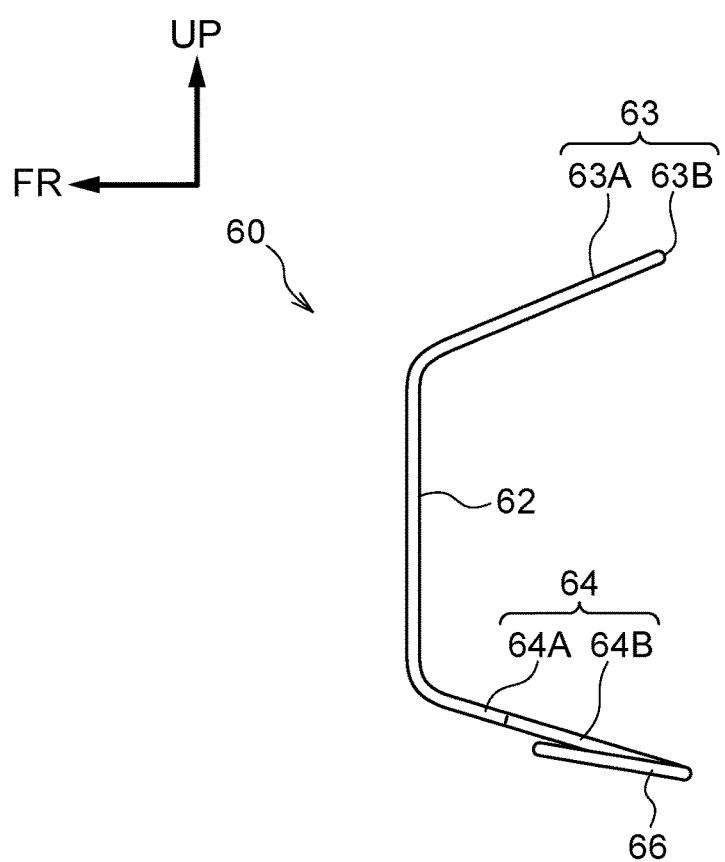
FIG. 12 is a side view of an insert wire according to an exemplary embodiment.

More specifically, as illustrated in FIG. 10, FIG. 11, and FIG. 12, each insert wire 60 includes a pair of side sections 62, a coupling section 63, a pair of widening sections 64, and a pair of lower end sections 66.

The pair of side sections 62 are disposed at both seat width direction sides of the opening 41, as illustrated in FIG. 11. Namely, the slit 46 and the recess 42 are disposed between the pair of side sections 62 in front view and in plan view. Each side section 62 extends upward in front view. Note that it is sufficient that the pair of side sections 62 be disposed at both seat width direction sides of at least part of the opening 41 (for example, the slit 46).

As illustrated in FIG. 11, the coupling section 63 is disposed at the upper side of the opening 41, and the coupling section 63 couples together upper end portions of the pair of side sections 62 such that lower end portions of the pair of side sections 62 are capable of separating from each other in the seat width direction. More specifically, the coupling section 63 includes a pair of inclined portions 63A and an upper end portion 63B. A lower end portion of each inclined portion 63A is connected to an upper end portion of the respective side section 62, and each inclined portion 63A extends upward from the upper end portion of the respective side section 62 in front view. Further, the pair of inclined portions 63A are inclined such that a seat width direction spacing between the pair of inclined portions 63A narrows on progression upward in front view.

Further, as illustrated in FIG. 12, the pair of inclined portions 63A extend toward the seat rear side in side view. More specifically, the pair of inclined portions 63A are inclined so as to extend gradually toward the rear side on progression upward in side view. The upper end portion 63B couples together the upper end portions of the inclined portions 63A and extends along the seat width direction. Further, at the rear side of the pair of side sections 62, the upper end portion 63B couples together the upper end portions of the pair of inclined portions 63A.

As illustrated in FIG. 11, a seat width direction spacing between the pair of widening sections 64 is wider than the seat width direction spacing between the pair of side sections 62. Each widening section 64 is connected to the lower end portion of the respective side section 62 and extends downward from the lower end portion of the respective side section 62 in front view.

More specifically, each widening section 64 includes an upper portion 64A and a lower portion 64B. The respective upper portions 64A are gradually inclined toward the seat width direction outside on progression downward in front view. The respective lower portions 64B extend downward in front view. As illustrated in FIG. 12, the upper portions 64A and the lower portions 64B extend toward the seat rear side in side view. Namely, the pair of widening sections 64 extend toward the seat rear side in side view.

Out of the pair of lower end sections 66, the lower end section 66 disposed on the right side is curved in a counterclockwise loop shape in plan view, as illustrated in FIG. 7. The lower end section 66 disposed on the left side is curved in a clockwise loop shape in plan view. As described above, the insert wire 60 is disposed around the opening 41, including at both seat width direction sides of the opening 41 and at the upper side of the opening 41.

As illustrated in FIG. 8, when the connector 102 is inserted into the opening 41, the insert wire 60 elastically deforms together with the seatback pad 40 such that the respective inclined portions 63A and the side sections 62 separate from each other in the seat width direction about the upper end portion 63B of the coupling section 63. The opening 41 is thereby widened in the seat width direction. Note that in the present exemplary embodiment, "separate" includes not only cases in which contacting members are separated from each other, but also cases in which members that were originally separated from each other become further apart such that the distance between them becomes longer.

(Operation and Advantageous Effects of the Present Exemplary Embodiment)

Explanation follows regarding operation and advantageous effects of the present exemplary embodiment.

As illustrated in FIG. 7, in the present exemplary embodiment, the connector 102 is inserted from the front between the edge 35A and the edge 37A, which are in a closed together state. Accordingly, as illustrated in FIG. 8, the edge 35A and the edge 37A separate from each other such that the connector 102 is inserted into the opening 41 (slit 46) from the front. When the connector 102 is inserted into the opening 41, the seatback pad 40 and the insert wire 60 elastically deform such that the opening 41 is widened in the seat width direction. The connector 102 that has been inserted into the opening 41 is connected to the ISOFIX bar 50.

When the connector 102 that has been inserted into the opening 41 is taken out of the opening 41, the seatback pad 40 and the insert wire 60 that were elastically deformed then elastically recover to their original shapes, and so the opening 41 narrows, closing the edge 35A and the edge 37A together (see FIG. 7).

In this manner, in the present exemplary embodiment, the seatback pad 40 keeps its shape using elastic recovery force of the insert wire 60 provided to the seatback pad 40. The seatback pad 40 can thereby be suppressed from losing its shape compared to a configuration in which the insert wire 60 is not provided to the seatback pad 40.

As illustrated in FIG. 11, in the present exemplary embodiment, the coupling section 63 couples together the upper end portions of the pair of side sections 62 such that the lower end portions of the pair of side sections 62 of the insert wire 60 are capable of separating from each other in the seat width direction. Moreover, in the present exemplary embodiment, the spacing in the seat width direction between the pair of widening sections 64 extending downward from the lower end portions of the pair of side sections 62 in front view is wider than the seat width direction spacing between the pair of side sections 62.

Thus, when the connector 102 is inserted into the opening 41, the lower end portions of the pair of side sections 62 separate from each other in the seat width direction about the coupling section 63, and the opening 41 readily widens in the seat width direction. The connector 102 can thus be smoothly inserted into the opening 41.

In particular, in the present exemplary embodiment, the width between the pair of inclined portions 63A of the coupling section 63 is configured to be wider in the seat width direction at the lower side portions of the inclined portions 63A than at the upper side portions of the inclined portions 63A. Thus, when the connector 102 is inserted into the opening 41, the upper end portion 63B of the coupling section 63 acts as a pivot point, and the lower side portions of the inclined portions 63A and the side sections 62 separate from each other easily. The connector 102 can thereby be even more smoothly inserted into the opening 41.

As illustrated in FIG. 12, in the present exemplary embodiment, when the connector 102 is inserted toward the seat rear and into the opening 41, the connector 102 can be guided by the pair of widening sections 64 since the pair of widening sections 64 extend toward the seat rear side in side view. The connector 102 can thereby be smoothly inserted into the opening 41.

As described above, in the present exemplary embodiment, so that the seatback pad 40 keeps its shape, the insert wires 60 are provided to the seatback pad 40. Thus, although there may also be insertion resistance from the insert wires 60 when inserting the connectors 102, configuration is such that, as described above, each connector 102 can be smoothly inserted into the respective opening 41, thereby lowering this insertion resistance. This enables, for example, testing criteria established by the IIHS (Insurance Institute for Highway Safety) regarding insertion input force on the connectors 102 to be satisfied.

Figure 13:
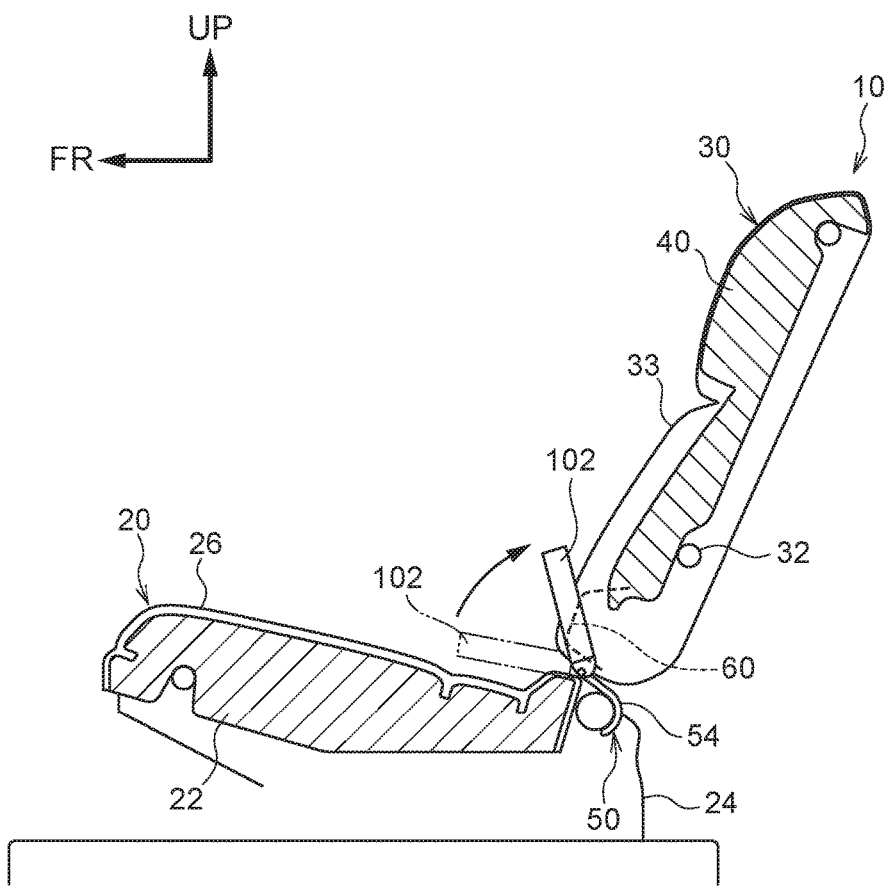
FIG. 13 is a side cross-section of the vehicle seat illustrated in FIG. 1, illustrating a state in which a front side section of a connector has been raised.

Further, as illustrated in FIG. 12, in the present exemplary embodiment, the upper end portion 63B of each coupling section 63 couples together the upper end portions of the pair of inclined portions 63A, at the seat rear side of the pair of side sections 62. Namely, the upper end portion 63B is retreated toward the seat rear side of the pair of side sections 62. Thus, for example, as illustrated in FIG. 13, the upper end portion 63B is less liable to interfere with the connector 102 even in cases in which a front side section of the connector 102 is raised in a state in which the connector 102 is connected to the ISOFIX bar 50.

Further, in the present exemplary embodiment, the up-down direction length of the slit 46 and the recess 42 is at least longer than the up-down direction length of the connector 102. Thus, for example, resistance can be lowered in cases in which the front side section of the connector 102 is raised in a state in which the connector 102 is connected to the respective ISOFIX bar 50.

Thus, in the present exemplary embodiment, for example, a range is secured that enables each connector 102 to move when the front side section of the connector 102 is raised in a state in which the connector 102 is connected to the ISOFIX bar 50. This enables, for example, testing criteria established by the IIHS (Insurance Institute for Highway Safety) regarding the angle of the range the connector 102 is able to move in to be satisfied.

Further, as illustrated in FIG. 4, in the present exemplary embodiment, the vertical grooves 48 are formed above the respective slits 46 so as to be continuous to the slits 46, thereby enabling the shape of the seatback pad 40 to be simplified such that it is easy to process the seatback pad 40.

Further, in the present exemplary embodiment, the openings 41 into which the connectors 102 are inserted are disposed at the lower side of the seams 70. The seams 70 thus become marks identifying the positions where the respective connectors 102 are to be inserted.

As illustrated in FIG. 7, in the present exemplary embodiment, the seat width direction width of each recess 42 that is in communication with the respective slit 46 in the front-rear direction is wider than the width of the slit 46. Resistance is thereby reduced when inserting the respective connector 102. The connectors 102 can thereby be smoothly inserted into the openings 41.

In the present exemplary embodiment, the lower end portions of the edge 35A and the edge 37A are fixed to the wire 88 through the pull-in cloths 82, 83 and the fixing member 86. The pull-in cloths 82, 83 thereby pull the lower end portions of the edge 35A and the edge 37A in toward the rear and inside the opening 41 (slit 46), applying tension to the front covering 35 and the side covering 37. Further, the edge 35A and the edge 37A contact each other to adopt a state in which the edge 35A and the edge 37A are closed together. The external appearance of the seatback 30 can thereby be preserved. Accordingly, in the present exemplary embodiment, an inferior external appearance of the seatback 30 can be suppressed while securing insertability of each connector 102.

(First Modified Example of Pull-In Structure)

Explanation follows regarding a first modified example of a pull-in structure at the lower end portions of the edge 35A and the edge 37A. Note that explanation of portions that are the same as in the exemplary embodiment described above is omitted as appropriate.

Figure 14:
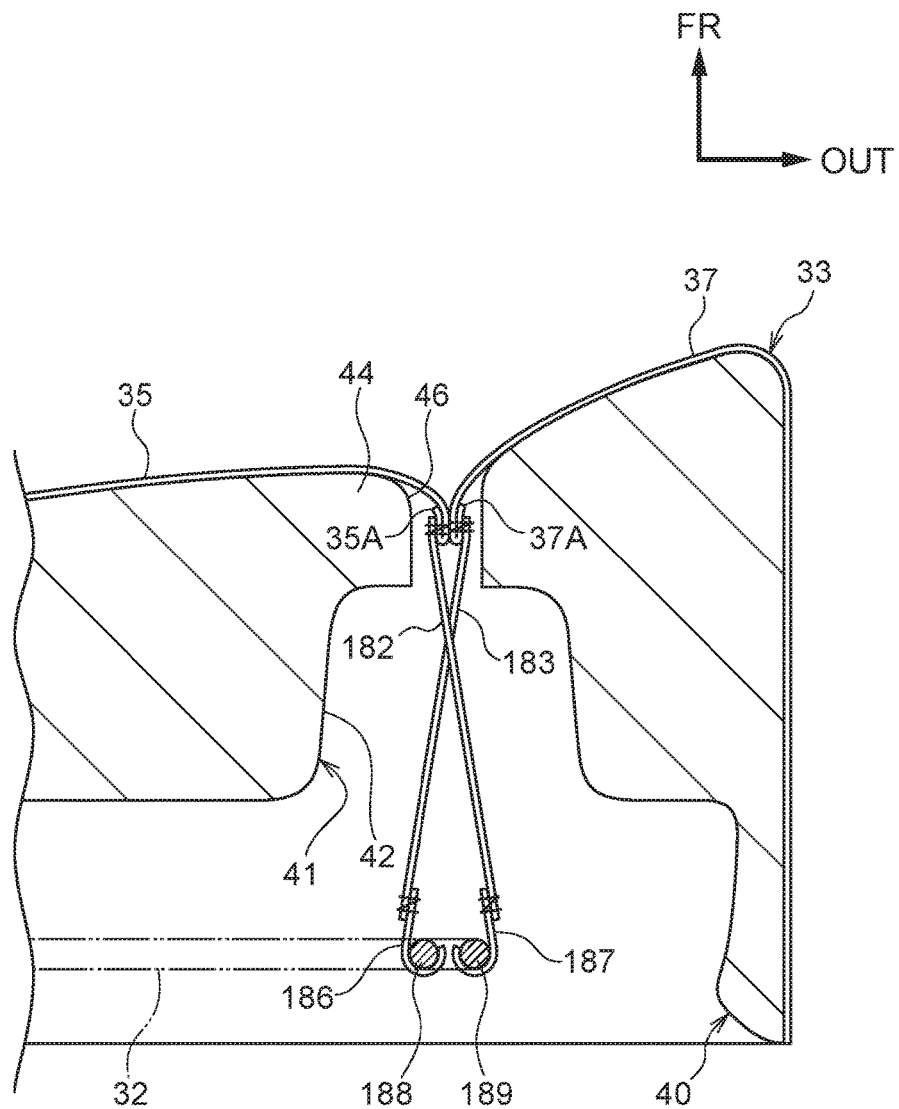
FIG. 14 is a horizontal cross-section illustrating a pull-in structure according to a first modified example.

As illustrated in FIG. 14, in the first modified example, the lower end portions of the edge 35A and the edge 37A (portions disposed in the slit 46) are stitched to respective front end portions (examples of other end portions) of a pull-in cloth 182 (an example of a first pull-in member) and a pull-in cloth 183 (an example of a second pull-in member). The lower end portions of the edge 35A and the edge 37A are not stitched together and so are capable of separating from each other.

A front end portion of the pull-in cloth 182 is disposed at a seat width direction inside with respect to a front end portion of the pull-in cloth 183, and a rear end portion (an example of one end portion) of the pull-in cloth 182 is disposed at a seat width direction outside with respect to a rear end portion (an example of one end portion) of the pull-in cloth 183. Namely, the pull-in cloth 182 and the pull-in cloth 183 cross each other.

Figure 15:
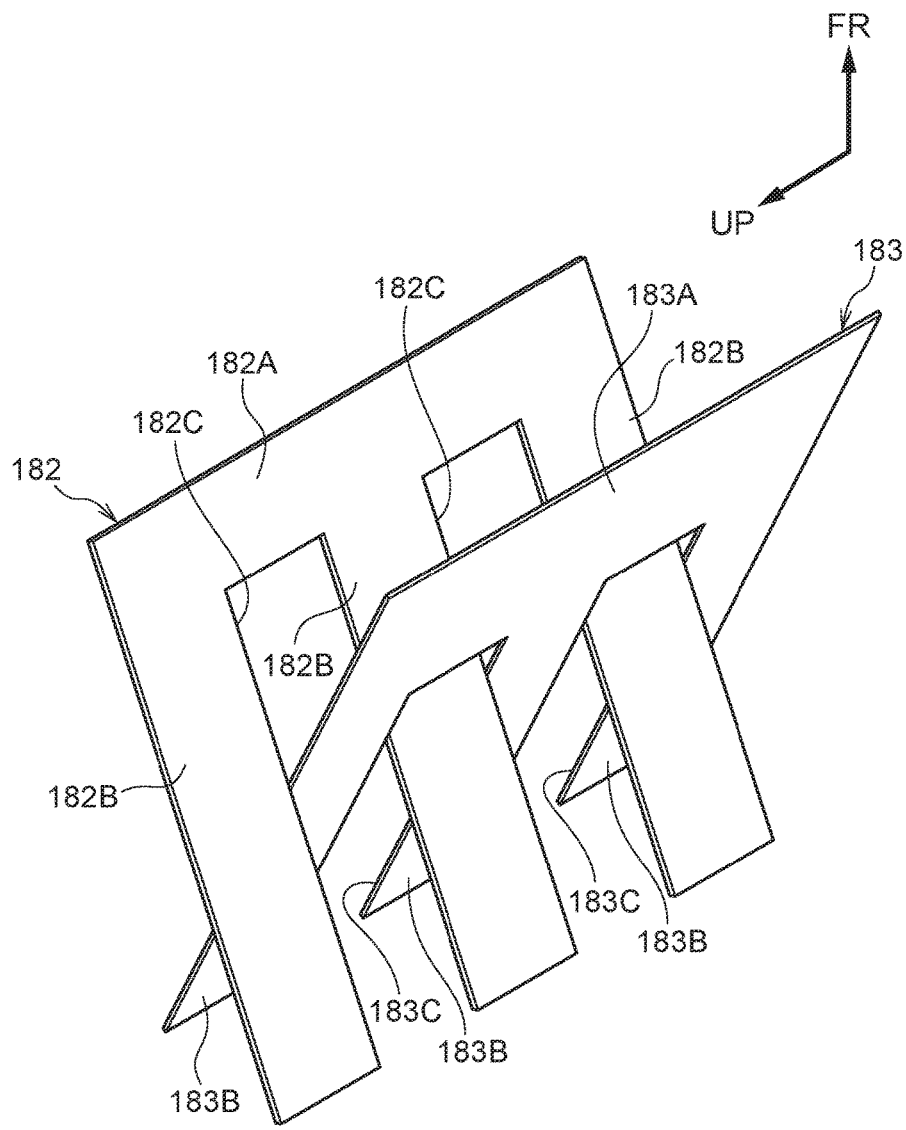
FIG. 15 is a perspective view illustrating configuration of a pull-in cloth according to the first modified example.

As illustrated in FIG. 15, the pull-in cloth 182 and the pull-in cloth 183 respectively include, for example, strip bodies 182A, 183A extending along the up-down direction, and plural (specifically, three) extension portions 182B, 183B extending from the strip bodies 182A, 183A toward the rear side. The plural extension portions 182B, 183B extend from the strip bodies 182A, 183A with gaps 182C, 183C therebetween in the up-down direction, such that the pull-in cloth 182 and the pull-in cloth 183 are formed in comb shapes (E-shaped). The pull-in cloth 182 and the pull-in cloth 183 cross each other by inserting the respective extension portions 182B, 183B through the corresponding gaps 183C, 182C.

The rear end portions of the pull-in cloths 182, 183 are fixed by being stitched to hook shaped fixing members 187, 186, respectively. The fixing members 186, 187 are respectively fixed to wires 188, 189 provided to the seatback frame 32 and extending in the up-down direction. The lower end portions of the edge 35A and the edge 37A are thus fixed to the wires 188, 189 through the pull-in cloths 182, 183 and the fixing members 186, 187 such that the pull-in cloths 182, 183 pull the lower end portions of the edge 35A and the edge 37A in toward the rear and inside the opening 41, applying tension to the front covering 35 and the side covering 37. The edge 35A and the edge 37A contact each other such that a closed state between the edge 35A and the edge 37A is achieved.

Figure 16:
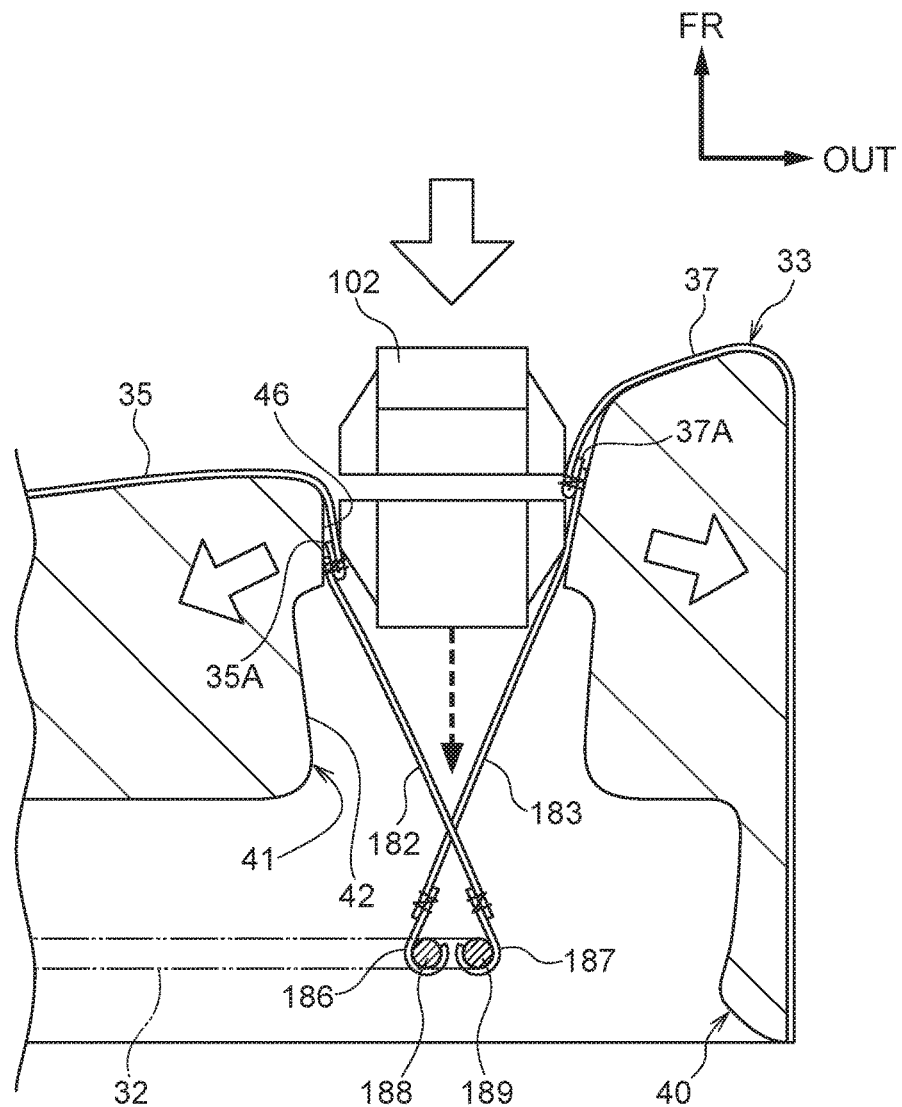
FIG. 16 is a horizontal cross-section of the pull-in structure illustrated in FIG. 14, illustrating a state in which a connector has been inserted into an opening.

In the first modified example, the connector 102 is inserted from the front between the edge 35A and the edge 37A, which are in the closed together state. Accordingly, as illustrated in FIG. 16, the edge 35A and the edge 37A separate from each other, and the connector 102 is inserted from the front and into the opening 41 (slit 46). When the connector 102 is inserted into the opening 41, the seatback pad 40 and the insert wire 60 elastically deform such that the opening 41 widens in the seat width direction. The connector 102 that has been inserted into the opening 41 is connected to the ISOFIX bar 50 (not illustrated in FIG. 16, see FIG. 8). Note that when the pull-in cloth 182 and the pull-in cloth 183 open, the crossing point therebetween is offset to a position further to the rear side than the front portion 52 of the ISOFIX bar 50.

In the first modified example, the pull-in cloth 182 and the pull-in cloth 183 cross each other, enabling the edge 35A to be pulled toward the rear while being pulled toward the seat width direction outside and enabling the edge 37A to be pulled toward the rear while being pulled toward the seat width direction inside. The edge 35A and the edge 37A can thereby be pulled in in a direction in which the edge 35A and the edge 37A close together. This enables an inferior external appearance of the seatback 30 to be effectively suppressed.

(Second Modified Example of Pull-In Structure)

Explanation follows regarding a second modified example of a pull-in structure at the lower end portions of the edge 35A and the edge 37A. Note that explanation of portions that are the same as in the exemplary embodiment described above is omitted as appropriate.

Figure 17:
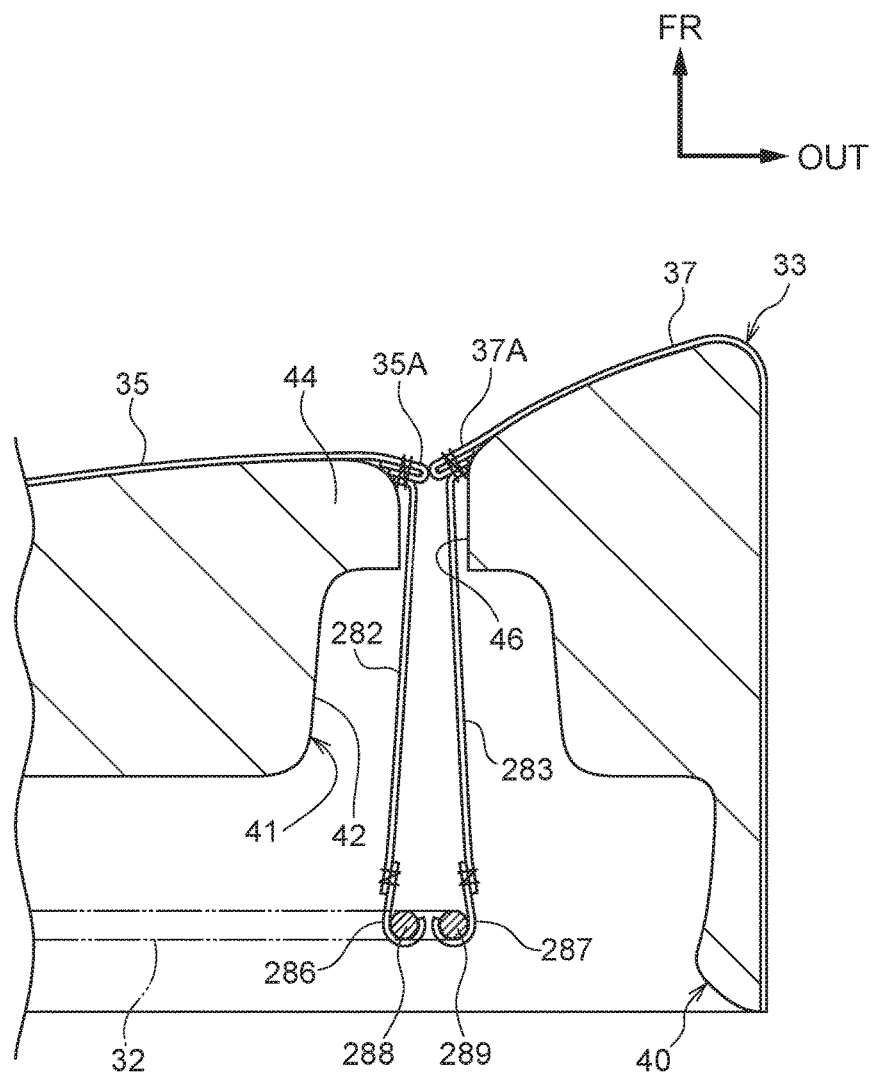
FIG. 17 is a horizontal cross-section illustrating a pull-in structure according to a second modified example.
Figure 18:
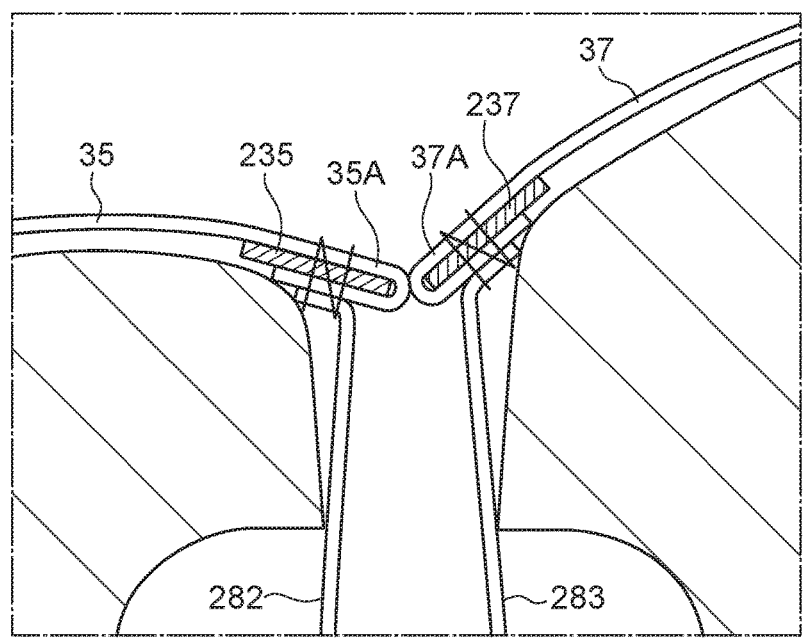
FIG. 18 is a horizontal cross-section illustrating an enlargement of part of the pull-in structure illustrated in FIG. 17.

As illustrated in FIG. 17 and FIG. 18 (an enlarged view of FIG. 17), in the second modified example, resin plates 235, 237 (examples of reinforcement members) are disposed at the lower end portions of the edge 35A and the edge 37A (portions disposed in the slit 46).

In a state in which the resin plates 235, 237 are tucked inside the respective edges 35A, 37A, the resin plates 235, 237 are then sewn together with the front end portions (an example of other end portions) of the pull-in cloth 282 (an example of a first pull-in member) and the pull-in cloth 283 (an example of a second pull-in member), respectively. The lower end portions of the edge 35A and the edge 37A are not stitched together and so are capable of separating from each other.

The front end portion and a rear end portion (an example of one end portion) of the pull-in cloth 282 are disposed at the seat width direction inside with respect to the front end portion and a rear end portion (an example of one end portion) of the pull-in cloth 283, and the pull-in cloth 282 and the pull-in cloth 283 do not cross each other.

The rear end portions of the pull-in cloths 282, 283 are fixed by being stitched to hook shaped fixing members 286, 287, respectively. The fixing members 286, 287 are respectively fixed to wires 288, 289 provided to the seatback frame 32 and extending in the up-down direction. The lower end portions of the edge 35A and the edge 37A are thus respectively fixed to the wires 288, 289 through the pull-in cloths 282, 283 and the fixing members 286, 287 such that the pull-in cloths 282, 283 pull the lower end portions of the edge 35A and the edge 37A in toward the rear and inside the opening 41, applying tension to the front covering 35 and the side covering 37. The edge 35A and the edge 37A contact each other such that a closed state between the edge 35A and the edge 37A is achieved.

In the second modified example, the edges 35A, 37A are reinforced by the resin plates 235, 237, enabling the edges 35A, 37A to keep their shapes and enabling an inferior external appearance of the seatback 30 to be suppressed.

(Other Modified Examples)

In the present exemplary embodiment, the opening 41 is configured by the slit 46 and by the recess 42 configured so as to be wider than the width W1 of the slit 46. However, there is no limitation thereto. The opening 41 may be configured having a uniform width in the front-rear direction.

In the present exemplary embodiment, the insert wire 60 is provided to the seatback pad 40. However, there is no limitation thereto. Configuration may be made in which no insert wire 60 is provided.

The present invention is not limited to the exemplary embodiment described above, and various changes, modifications, and improvements are possible. For example, configuration may be made using plural of the modified examples described above in combination, as appropriate.

What is claimed is:

1. A vehicle seat comprising:
   a seatback pad that configures a cushion member of a seatback, and that is formed with an opening into which a connector of a child seat can be inserted from a seat front so as to penetrate through a lower end section of the seatback pad in a seat front-rear direction, a front end of the opening having a width along a seat width direction narrower than a seat width direction width of the connector;
   a connection member that is provided at a seat rear side with respect to the front end of the opening, and to which the connector inserted into the opening is to be connected;
   a first covering that covers a front face of the seatback pad at one seat width direction side of the opening, and that includes a first edge disposed in the opening;
   a second covering that covers the front face of the seatback pad at another seat width direction side of the opening, and that includes a second edge disposed in the opening;
   a first pull-in member that includes one end portion fixed to a fixing member disposed further to the seat rear side than a connection position of the connection member and the connector, and another end portion connected to the first edge, the first pull-in member being configured to pull the first edge in toward the seat rear side of the opening so as to enable the first edge to separate from the second edge; and
   a second pull-in member that includes one end portion fixed to the fixing member disposed further to the seat rear side than the connection position of the connection member and the connector, and another end portion connected to the second edge, the second pull-in member being configured to pull the second edge in toward the seat rear side of the opening so as to enable the second edge to separate from the first edge.

2. The vehicle seat of claim 1, wherein:
the another end portion of the first pull-in member is disposed at the another seat width direction side with respect to the another end portion of the second pull-in member; and
the first pull-in member and the second pull-in member cross each other.

3. The vehicle seat of claim 1, further comprising reinforcement members that are respectively disposed at the first edge and the second edge, and that are respectively sewn to the another end portion of the first pull-in member and the another end portion of the second pull-in member.

4. The vehicle seat of claim 1, wherein a vertical groove is formed in the front face of the seatback pad so as to be continuous to the opening at an upper side of the opening, with a seam between the first covering and the second covering being pulled toward the seat rear side into the vertical groove.

* * * * *